(12) United States Patent
Lim et al.

(10) Patent No.: US 8,290,534 B2
(45) Date of Patent: Oct. 16, 2012

(54) METHOD AND SYSTEM FOR SUBSCRIBING TO DIGITAL BROADCASTING SERVICE THROUGH MOBILE COMMUNICATION NETWORK

(75) Inventors: Han-Na Lim, Siheung-si (KR); Jong-Hyo Lee, Pyeongtaek-si (KR); Un-Taek Lim, Suwon-si (KR); Sung-Jin Park, Suwon-si (KR); Ki-Ho Jung, Seoul (KN); Ju-Yeon Song, Seoul (KR); Jun-Hwan Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 796 days.

(21) Appl. No.: 11/091,264

(22) Filed: Mar. 28, 2005

(65) Prior Publication Data

US 2005/0227675 A1 Oct. 13, 2005

(30) Foreign Application Priority Data

Mar. 26, 2004 (KR) .................. 10-2004-0020807

(51) Int. Cl.
*H04M 1/00* (2006.01)

(52) U.S. Cl. ............... 455/552.1; 455/3.01; 455/3.04; 455/3.05; 455/3.06; 455/414.1; 370/310.2; 370/312; 370/328; 370/329; 370/353; 725/39; 725/62; 725/63; 725/73; 725/74; 725/81

(58) Field of Classification Search ........... 455/414.1, 455/414.2, 414.3, 414.4, 432.1, 433, 3.01, 455/3.04, 3.05, 3.06, 422.1, 552.1, 435.1; 725/39, 62, 63, 73, 74, 81, 98, 99; 370/310, 370/310.2, 312, 328, 329, 353, 356
See application file for complete search history.

(56) References Cited

U.S. PATENT DOCUMENTS

| | | | |
|---|---|---|---|
| 6,763,236 B2 * | 7/2004 | Siren | 455/450 |
| 6,904,567 B1 * | 6/2005 | Hermann et al. | 715/756 |
| 7,050,789 B2 * | 5/2006 | Kallio et al. | 455/411 |
| 7,593,407 B2 * | 9/2009 | Chun et al. | 370/394 |
| 7,634,794 B1 * | 12/2009 | Paik et al. | 725/62 |
| 2002/0023264 A1 * | 2/2002 | Aaltonen et al. | 725/62 |
| 2002/0059614 A1 * | 5/2002 | Lipsanen et al. | 725/75 |
| 2004/0185869 A1 * | 9/2004 | Lee et al. | 455/456.1 |
| 2005/0102703 A1 * | 5/2005 | Querashi et al. | 725/117 |
| 2005/0136884 A1 * | 6/2005 | Reidelsturz et al. | 455/403 |

FOREIGN PATENT DOCUMENTS

| | | |
|---|---|---|
| EP | 1401131 A2 * | 3/2004 |
| JP | 2000-261778 | 9/2000 |
| KP | 10-2004-0102772 | 12/2004 |
| WO | WO 02/096109 | 11/2002 |
| WO | WO 03045064 A1 * | 5/2003 |
| WO | WO 03/090484 | 10/2003 |

* cited by examiner

*Primary Examiner* — Olumide T Ajibade Akonai
(74) *Attorney, Agent, or Firm* — The Farrell Law Firm, P.C.

(57) ABSTRACT

A method and apparatus for subscribing to a digital broadcasting service using mobile network subscription information in a system where a 3G (third generation) mobile communication network interacts with a DBS (digital broadcasting system) are provided. When a user requests subscription to the digital broadcasting service through a digital broadcasting-enabled mobile equipment, a DBS-CSCF (call session control function) in the 3G network transmits to an SAS (subscription agent server) of the DBS a service subscription request including the mobile subscription information or additional user personal information. The SAS processes the subscription and transmits information required for reception of the digital broadcasting to the mobile equipment. The mobile equipment changes its digital broadcasting reception setting.

40 Claims, 9 Drawing Sheets

METHOD AND SYSTEM FOR SUBSCRIBING
TO DIGITAL BROADCASTING SERVICE
THROUGH MOBILE COMMUNICATION
NETWORK

PRIORITY

This application claims priority under 35 U.S.C. §119 to an application entitled "Method and System for Subscribing to Digital Broadcasting Service through Mobile Communication Network" filed in the Korean Intellectual Property Office on Mar. 26, 2004 and assigned Serial No. 2004-20807, the contents of which are incorporated herein by reference.

BACKGROUND OF THE INVENTION

1. Field of the Invention

The present invention relates to a method and system for enabling a third generation (3G) mobile equipment to subscribe to a digital broadcasting service and receive the digital broadcasting service by using information about the mobile equipment's subscription to a 3G mobile communication network.

2. Description of the Related Art

The digitization of terrestrial broadcasting and satellite broadcasting and the launching of digital broadcasting have resulted in the proliferation of digital broadcast programs. At present, many users view the digital broadcasts through fixed digital TV terminals. A user can subscribe to the digital broadcasts using a written form, using a telephone device etc. and then must wait some time before being able to receive the desired digital broadcast.

The recent rapid development of mobile communication technology has spurred the introduction of mobile equipment equipped with a digital broadcasting reception function. This mobile equipment can access a 3G mobile communication network, receive mobile communication services, and receive a digital broadcast over the mobile communication network. However, the conventional subscription methods used to subscribe to digital broadcast systems are not suitable for mobile equipment wherein simplicity and fast service are highly desired. Moreover, mobile equipment users may be required to provide a digital broadcast service provider with the same personal information as submitted for subscription to the 3G mobile communication network. Accordingly, this is a need for a method for subscribing to the digital broadcast in real time/on line using the existing subscription information of the mobile communication network.

SUMMARY OF THE INVENTION

An object of the present invention is to substantially solve at least the above problems and/or disadvantages and to provide at least the advantages below. Accordingly, an object of the present invention is to provide a method and system for transmitting 3G network subscription information and other required information of a 3G network subscriber (i.e., a user) to a DBS (Digital Broadcasting System) upon request for subscription to a digital broadcasting service by the 3G network subscriber, which will be received through digital broadcasting-enabled user equipment UE from the 3G network subscriber.

Another object of the present invention is to provide a method and apparatus for transmitting broadcasting reception information to a mobile equipment in a digital broadcasting system.

A further object of the present invention is to provide a method and system for changing the digital broadcasting reception setting of mobile equipment according to broadcasting reception information received from an SAS (Subscription Agent Server).

The above objects are achieved by providing a method and apparatus for subscribing to a digital broadcasting service using mobile network subscription information in a system where a 3G mobile communication network interacts with a DBS.

According to one aspect of the present invention, in a method of subscribing to a digital broadcasting service using mobile subscription information associated with a subscription to a mobile communication network and receiving the digital broadcasting service, a subscription request message is transmitted from the mobile communication network to a DBS, upon request of a user through mobile equipment. The subscription request message contains mobile subscription information of the user required for subscription to the digital broadcasting service. Broadcasting reception information required for the mobile equipment to receive the digital broadcasting service is received from the DBS. The broadcasting reception information is set at the mobile equipment so that the user can receive the digital broadcasting service, and the digital broadcasting service is received according to the broadcasting reception information at the mobile equipment.

According to another aspect of the present invention, in a method of subscribing to a digital broadcasting service using mobile subscription information associated with subscription to a mobile communication network and receiving the digital broadcasting service, subscription items required for subscription to the digital broadcasting service are requested, upon request of a user through mobile equipment, and received from a DBS. A subscription request message containing mobile subscription information of the user required for the subscription to the digital broadcasting service is transmitted to the DBS. Broadcasting reception information required for the mobile equipment to receive the digital broadcasting service is received from the DBS. The broadcasting reception information is set at the mobile equipment so that the user can receive the digital broadcasting service, and the digital broadcasting service is received according to the broadcasting reception information at the mobile equipment.

According to a further aspect of the present invention, in a system having a mobile communication network and a DBS which interact with each other and have made an Service Provision Agreement (SPA), a first subscription management server transmits mobile subscription information of a user associated with the mobile communication network to the DBS, upon request of the user through mobile equipment which has subscribed to the mobile communication network and is capable of receiving a digital broadcasting service from the DBS. A gateway discriminates the mobile subscription information received from the first subscription management server and transmits the mobile subscription information to the DBS. A second subscription management server, which is connected to the first subscription management server through the gateway, processes the subscription of the user to the digital broadcasting service using the mobile subscription information and personal information of the user received from the first subscription management server or the user, and transmits to the mobile equipment broadcasting reception information required for reception of the digital broadcasting service.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Interacting between a 3G mobile communication network and a DBS can occur over the Internet. The present invention pertains to the configuration and operation of a system in which a DBS interacts with a WCDMA (Wideband Code Division Multiple Access) mobile communication network based on 3G asynchronous mobile communication standards, 3GPP (3rd Generation Project Partnership).

A description is first made of the configuration and operation of a system for managing subscriber information and providing Internet service for interacting with the DBS in the WCDMA system.

Figure 1:
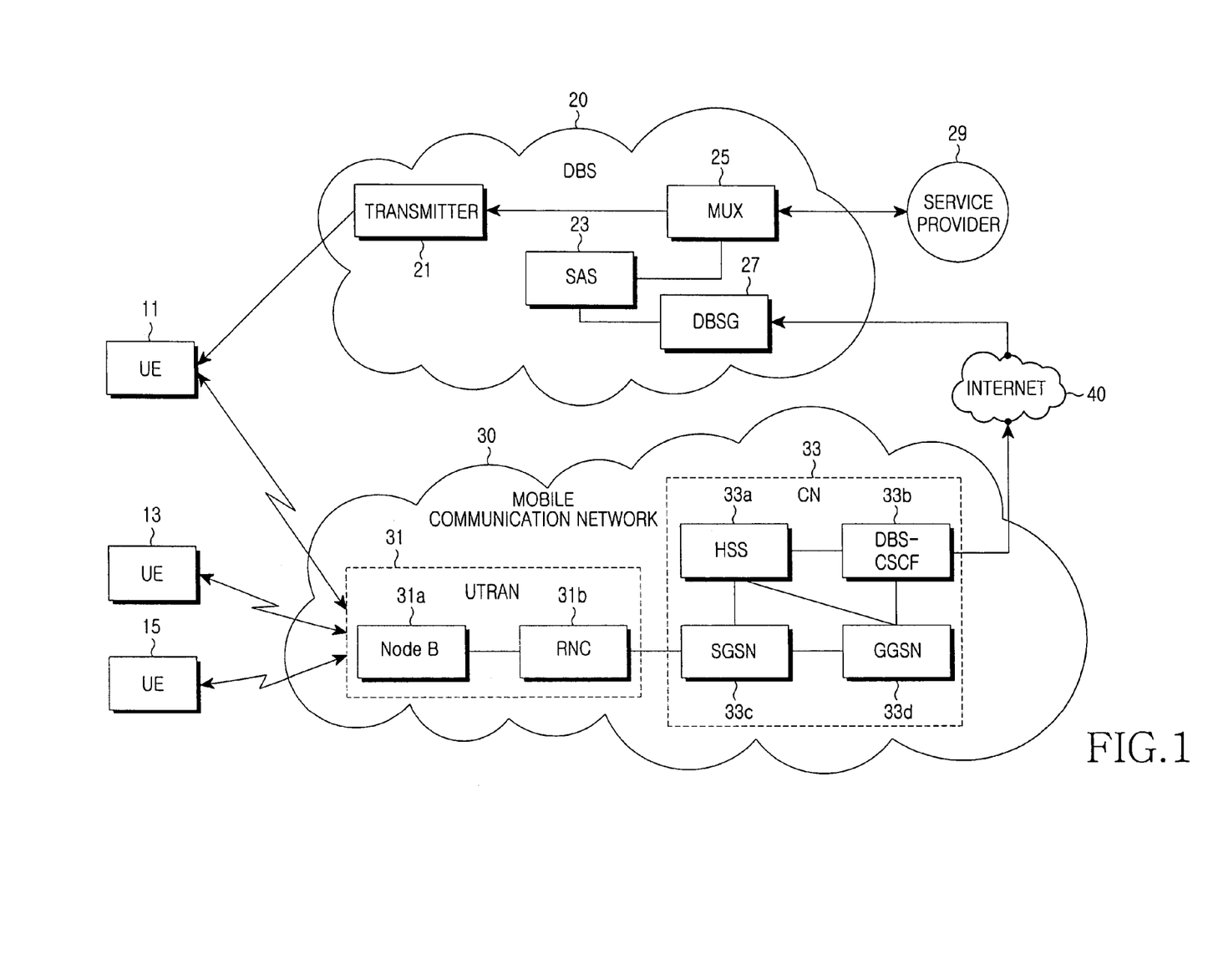
FIG. 1 is a block diagram of a WCDMA system and a DBS which interact with each other according to a preferred embodiment of the present invention.

FIG. 1 is a block diagram of the WCDMA system and the DBS which interact with each other according to a preferred embodiment of the present invention. UEs (User Equipments) 11, 13 and 15 are mobile equipments which subscribe to a 3G mobile communication network 30 and can receive digital broadcasting. A UTRAN (UMTS Terrestrial Radio Access Network) 31 is made up of a plurality of Node Bs 31a and at least one RNC (Radio Network Controller) 31b, for transmitting data received from the 3G network 30 to the UEs 11, 13 and 15.

The RNC 31b selectively transmits data to a particular cell and controls radio channels (not shown). The RNC also controls the underlying Node Bs 31a and each Node B 31a controls cells within its coverage area. The RNC 31b allocates and manages radio resources to the Node Bs 31a and the Node Bs 31a actually provide the radio resources to the UEs 11, 13 and 15. Because the radio resources are configured on a cell basis, the radio resources provided by the Node Bs 31a are said to be those of the respective cells that the Node Bs 31a manage. The UEs 11, 13 and 15 configure radio channels using radio resources provided by a particular cell which is under the control of the Node B 31a that the UEs belong to, and conduct communications.

A CN (Core Network) 33 includes at least one HSS (Home Subscriber Server) 33a, at least one SGSN (Serving GPRS Supporting Node) 33c, at least one GGSN (Gateway GPRS Support Node) 33d, and at least one DBS-CSCF 33b.

The HSS 33a manages the mobility of 3G network subscribers, processes calls, and manages subscriber mobility information and other additional service information in a database. For call processing, the HSS 33a stores and manages mobile subscription information including basic information and additional service information. The basic information includes subscriber phone numbers, terminal serial numbers, call process routing information (location information), and subscriber authority and additional service information including information related to incoming call number display, call forwarding, etc. The HSS 33a is provided with, or interacts with, an AAA (Authentication, Authorization, and Accounting) (not shown) server for authenticating 3G network subscribers.

The SGSN 33c controls 3G network-related services for subscribers. The main functionality of the SGSN 33c is to manage service billing data for each subscriber and to transmit packet data received from the GGSN 33d to a particular RNC 31b. The GGSN 33d serves as an entry point of IP (Internet Protocol) traffic received from an external network in the WCDMA system. That is, the GGSN 33d functions as an IP router in the WCDMA system.

The DBS-CSCF 33b is a subscription managing server having a digital broadcasting subscription function in addition to the existing WCDMA CSCF function. A CSCF is an essential entity to an IM CN (IP Multimedia Core Network) subsystem added to an existing CN, to allow subscribers to receive IP network services. The CSCF controls sessions to provide the subscribers with services of the IM CN. In other words, the CFCN functions similarly to an SIP (Session Initiation Protocol) server. The CSCF also communicates with the HSS 33a. The DBS-CSCF 33b includes all the above-described CSCF functions. For example, the DBS-CSCF 33b performs a session control so that the UEs 11, 13 and 15 or the DBS-CSCF 33b can exchange information with an SAS 23 within a DBS 20 over an Internet 40. Additionally, the DBS- CSCF 33b transmits digital broadcasting subscription requests to the SAS 23 and transmits broadcasting reception information received from the SAS 23 to the UEs 11, 13 and 15.

The DBS 20 includes a DBSG (Digital Broadcast System Gateway) 27, the SAS 23, a multiplexer (MUX) 25, and a transmitter 21.

The DBSG 27 transmits IP traffic received over the Internet 40 selectively to the SAS 23. More specifically, the DBSG 27 transmits a message such as a subscription request received from the HSS 33a of the mobile communication network 30 to the SAS 23 according to the present invention.

According to a preferred embodiment of the present invention, the SAS 23 processes the digital broadcasting subscription requests of the UEs 11, 13 and 15 received from the mobile communication network 30 and provides broadcasting reception information to the UEs 11, 13 and 15, to thereby allow the UEs 11, 13 and 15 to receive the digital broadcasting. The SAS 23 also transmits digital broadcasting subscription information to the MUX 25 so that the UEs 11, 13 and 15 can receive their requested digital broadcasting only and do not receive non-requested broadcasting.

The MUX 25 manages digital broadcasting contents in communication with a digital broadcasting service provider 29 and transmits the digital broadcasting content to the transmitter 21.

The transmitter 21 is a unidirectional device that transmits the digital broadcasting content directly to the UE 11.

A procedure for enabling mobile subscribers to subscribe to a digital broadcasting service through the above-described interacting system according to preferred embodiments of the present invention will now be described.

A Service Provision Agreement (SPA) (i.e. an agreement between service providers such as a 3G network service provider and a digital broadcasting service provider, to provide a particular service or services) is made between a 3G network service provider and a digital broadcasting service provider. The service providers specify required conditions and policies to provide a particular service to users through interacting between the two heterogeneous systems. In relation to a subscription service, the SPA can be considered largely in two ways.

Figure 2:
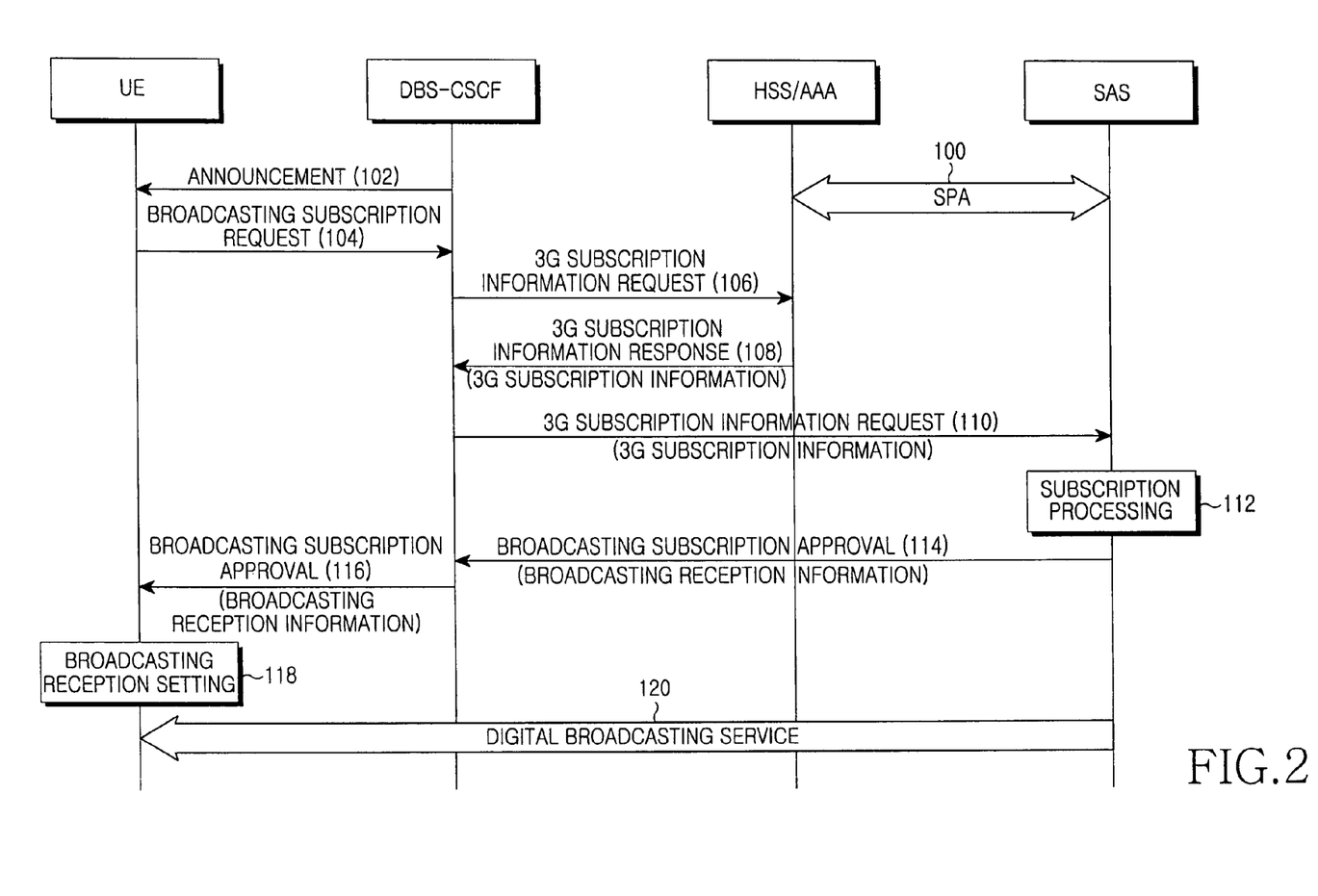
FIG. 2 is a flow diagram illustrating a signal flow for a subscription procedure in the case where a user can subscribe to digital broadcasting using the user's mobile communication network subscription information according to a preferred embodiment of the present invention.

(1) In the case where the SPA specifies subscription items required for subscription to the digital broadcasting service, if 3G network subscription information suffices for the digital broadcasting subscription, the DBS-CSCF 33b requests the subscription to the SAS 23, providing the 3G network subscription information (see FIG. 2). If user personal information is further needed, the DBS-CSCF 33b receives associated information from the user of the UE and requests the subscription to the SAS 23 using the received information (see FIG. 3) or the user himself additionally requests the subscription to the SAS 23 (see FIG. 4)

(2) In the case where the subscription items are not specified in the SPA, the SAS 23 notifies the DBS-CSCF 33b of the subscription items and requests corresponding information, upon request for a digital broadcasting subscription from a user. If 3G network subscription information suffices for the digital broadcasting subscription, the DBS-CSCF 33b requests the subscription to the SAS 23, providing the 3G network subscription information (see FIG. 5). If user personal information is further needed, the DBS-CSCF 33b receives associated information from the user and requests the subscription to the SAS 23 using the received information (see FIG. 6) or the user himself additionally requests the subscription to the SAS 23 (see FIG. 7).

Figure 3:
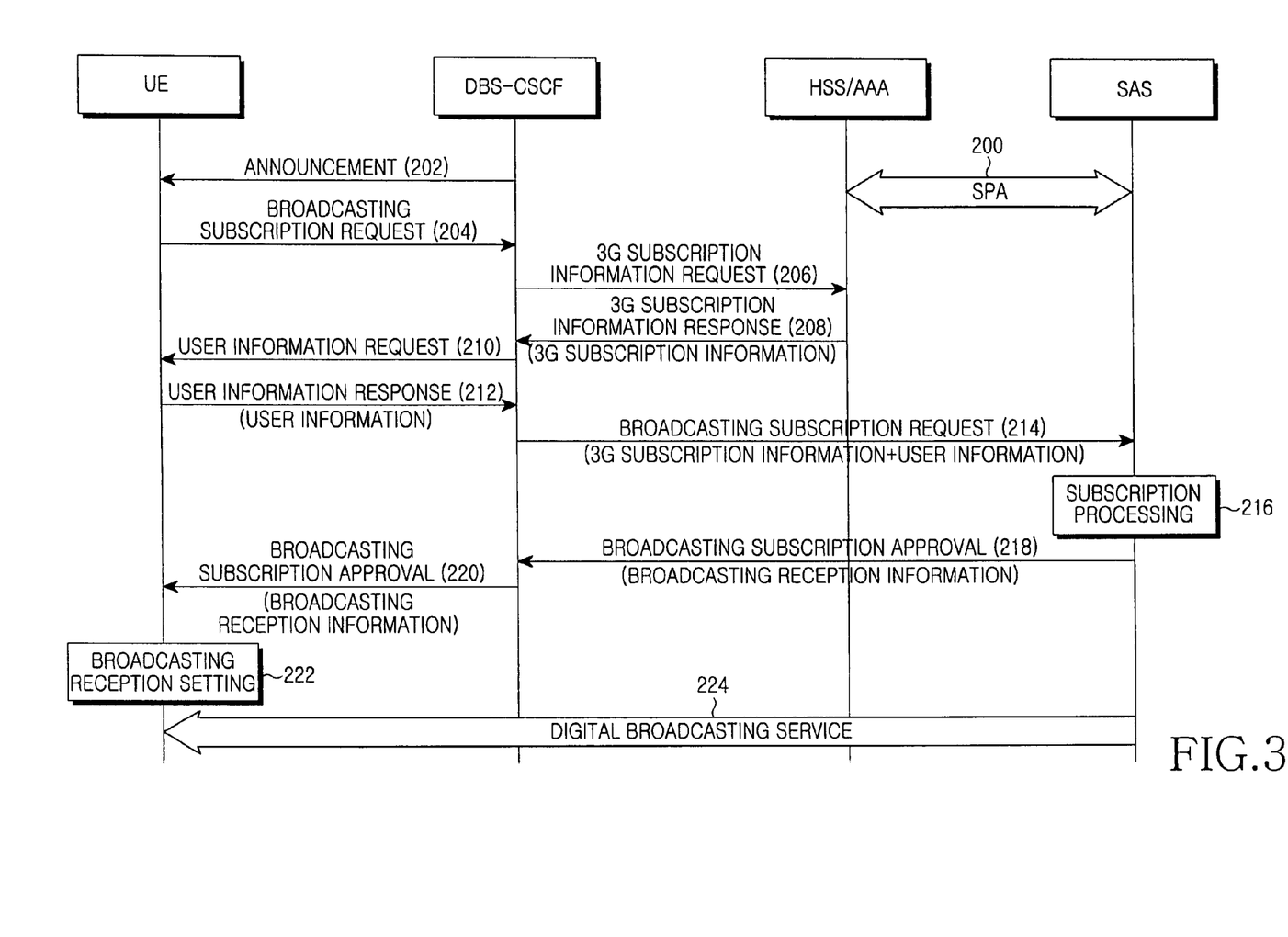
FIG. 3 is a flow diagram illustrating a signal flow for a subscription procedure in the case where user personal information and the mobile communication network subscription information, is required to subscribe to the digital broadcasting according to a second preferred embodiment of the present invention.
Figure 4:
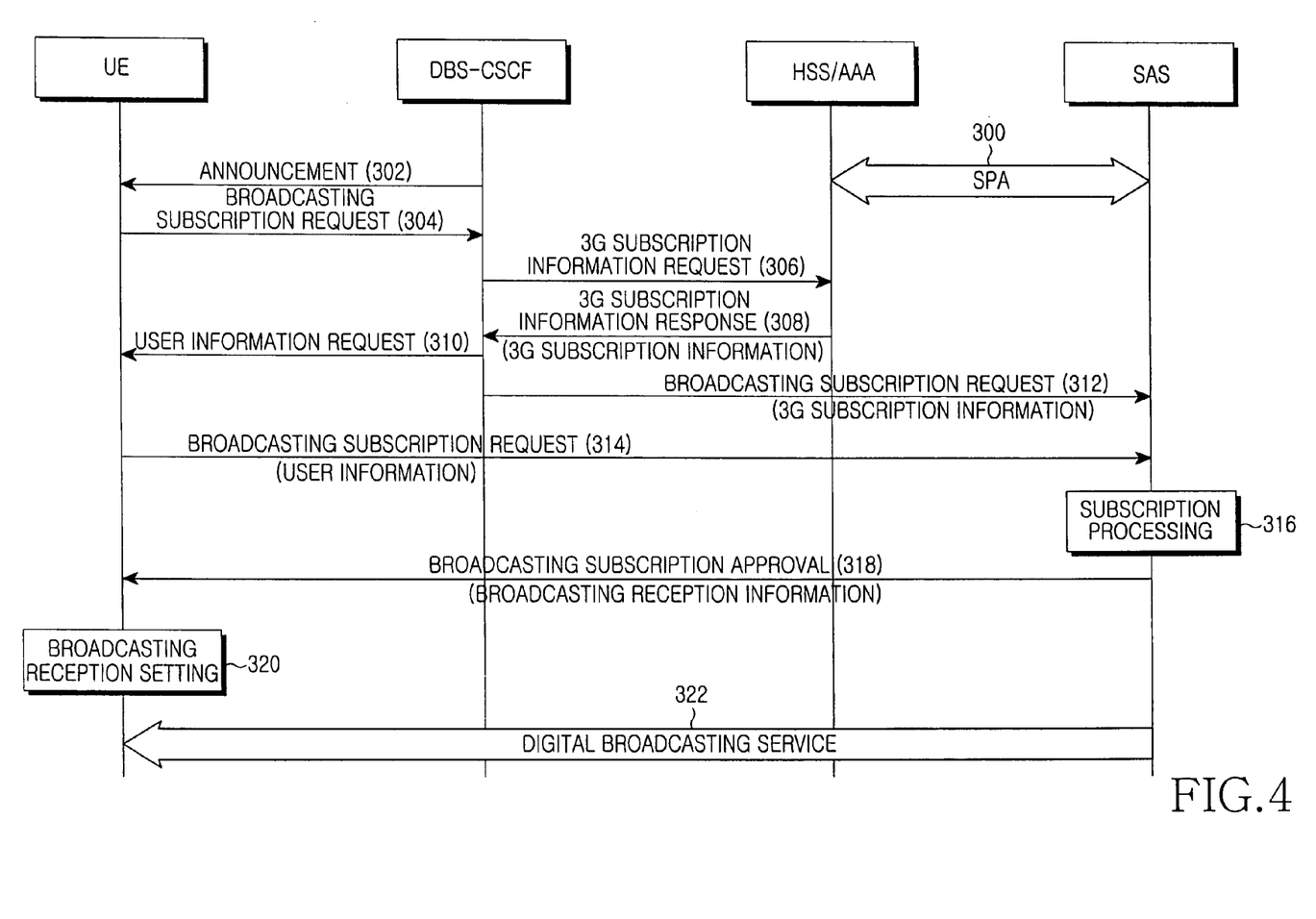
FIG. 4 is a flow diagram illustrating a signal flow for a subscription procedure in the case where the user personal information and the mobile communication network subscription information, is required to subscribe to the digital broadcasting according to a third preferred embodiment of the present invention.

FIGS. 2, 3 and 4 illustrate procedures for subscribing to a digital broadcasting service in the case where the SPA specifies information needed for digital broadcasting subscription according to preferred embodiments of the present invention.

FIG. 2 is a flow diagram illustrating a signal flow for a subscription procedure in the case where a user can subscribe to a digital broadcasting service using the user's mobile communication network subscription information according to a preferred embodiment of the present invention. This figure further illustrates a subscription procedure when the SPA specifies the items required for the digital broadcasting subscription and 3G network subscription information suffices according to a preferred embodiment of the present invention. The SAS defines the SPA specifying the items required for digital broadcasting subscription with the AAA server or HSS (hereinafter, referred to as HSS/AAA) that manages 3G network subscription information in step 100. In step 102, the DBS-CSCF announces that digital broadcasting is available to a user (through the user's UE) in the current location according to the SPA. The UE of the user who has not subscribed to digital broadcasting yet perceives that it can receive the digital broadcasting where it is now located.

In step 104, the UE requests subscription to the digital broadcasting to the DBS-CSCF. The DBS-CSCF asks the HSS/AAA for the 3G network subscription information, that is, mobile subscription information of the user in step 106. Specifically, the DBS-CSCF requests subscription information corresponding to the items specified in the SPA to the DBS-CSCF. The HSS/AAA transmits the 3G network subscription information to the DBS-CSCF in step 108 and the DBS-CSCF requests the digital broadcasting subscription to the SAS, while transmitting the 3G network subscription information in IP traffic in step 110. To do so, the DBS-CSCF opens a session by SIP signaling between the DBS-CSCF and the SAS, and interaction between the DBS-CSCF and the SAS occurs through the session.

In step 112, the SAS processes the digital broadcasting subscription using the 3G network subscription information. At the same time, the SAS provides the subscription process result to the MUX so that a setting necessary for the UE to receive the digital broadcasting is performed within the DBS. The SAS transmits digital broadcasting reception information to the DBS-CSCF in step 114 and the DBS-CSCF forwards the broadcasting reception information to the UE in order to notify that the digital broadcasting subscription has been approved in step 116. In another case, a transmitter of the digital broadcasting system can directly notify the UE of the digital broadcasting subscription approval (steps 114 and 116). In step 118, the UE performs a necessary setting according to the broadcasting reception information, including radio channel setup. After the setting is completed, the user receives the digital broadcasting service in step 120.

FIG. 3 illustrates a subscription procedure when the SPA specifies the items required for the digital broadcasting subscription and user personal information is needed in addition to 3G network subscription information according to a second preferred embodiment of the present invention. The SAS defines the SPA specifying the items required for digital broadcasting subscription with the HSS/AAA in step 200. In optional step 202, the DBS-CSCF announces that digital broadcasting is available to the user (through the user's UE) in the current location according to the SPA. The user, who has not subscribed to digital broadcasting yet, perceives that the user is now located in a digital broadcasting service area by the announcement procedure of a 3G network. The announcement step 202 can be omitted.

In step 204, the UE requests subscription to the digital broadcasting to the DBS-CSCF. The DBS-CSCF asks the HSS/AAA for the 3G network subscription information of the user in step 206. The HSS/AAA transmits the 3G network subscription information to the DBS-CSCF in step 208.

Meanwhile, aside from the 3G network subscription information, the DBS-CSCF requests the user personal information of the user to the UE in response to the broadcasting subscription request of step 204 in step 210. When receiving the user personal information from the UE in step 212, the DBS-CSCF requests the digital broadcasting subscription to the SAS, transmitting the 3G network subscription information and the user personal information in IP traffic in step 214. To do so, the DBS-CSCF opens a session by SIP signaling between the DBS-CSCF and the SAS, and interaction between the DBS-CSCF and the SAS occurs through the session. The DBS-CSCF is responsible for management of the session.

In step 216, the SAS processes the digital broadcasting subscription using the 3G network subscription information. At the same time, the SAS provides the subscription process result to the MUX so that a setting necessary for the UE to receive the digital broadcasting is performed within the DBS. The SAS transmits digital broadcasting reception information required for digital broadcasting reception to the DBS-CSCF in step 218 and the DBS-CSCF forwards the digital broadcasting reception information to the UE in step 220. In alternative embodiment, the transmitter can directly notify the UE of digital broadcasting subscription approval (e.g., see steps 114 and 116 in FIG. 1). In step 222, the UE performs a necessary setting according to the broadcasting reception information, including radio channel setup. After the setting is completed, the user's UE receives the digital broadcasting service in step 224.

FIG. 4 illustrates a subscription procedure when the SPA specifies the items required for the digital broadcasting subscription and user personal information is needed in addition to 3G network subscription information according to a third preferred embodiment of the present invention. The SAS defines the SPA specifying the items required for digital broadcasting subscription with the HSS/AAA in step 300. In optional step 302, the DBS-CSCF announces that digital broadcasting is available to the user in the current location according to the SPA. The user, who has not subscribed to digital broadcasting yet, perceives the user is now located in a digital broadcasting service area by the announcement procedure.

In step 304, the UE requests subscription to the digital broadcasting to the DBS-CSCF. The DBS-CSCF asks the HSS/AAA for the 3G network subscription information of the user in step 306. The HSS/AAA transmits the 3G network subscription information to the DBS-CSCF in step 308. Meanwhile, aside from the 3G network subscription information, the DBS-CSCF requests the user personal information of the user to the UE in response to the broadcasting subscription request of step 304 in step 310.

When the DBS-CSCF receives the 3G network subscription information of the step 308, the DBS-CSCF requests the digital broadcasting subscription including the 3G network subscription information to the SAS in step 312. To do so, the DBS-CSCF opens a session by SIP signaling between the DBS-CSCF and the SAS, and interaction between the DBS-CSCF and the SAS occurs through the session. In step 314, the UE requests the digital broadcasting subscription directly to the SAS in response to the personal information request of step 310, transmitting the user personal information in IP traffic. The direct requesting means that the subscription request is transmitted to the SAS, transparently passing the DBS-CSCF. That is, the UE transmits a subscription request message including the user personal information to the SAS in IP traffic. To do so, a session is opened between the UE and the SAS by SIP signaling and the UE and the SAS interact through the session.

In step 316, the SAS processes the digital broadcasting subscription using the 3G network subscription information and the user personal information. At the same time, the SAS provides the subscription process result to the MUX so that a setting necessary for the UE to receive the digital broadcasting is performed within the DBS. The SAS transmits digital broadcasting reception information required for digital broadcasting reception directly to the UE to notify approval of the digital broadcasting subscription in step 318. Similarly, the direct transmission means that the SAS transmits the broadcasting subscription approval to the UE in IP traffic, transparently passing the DBS-CSCF. In an alternative embodiment, the transmitter can directly notify the UE of digital broadcasting subscription approval of step 318. In step 320, the UE performs a necessary setting according to the broadcasting reception information, including radio channel setup. After the setting is completed, the user receives the digital broadcasting service in step 322.

Figure 5:
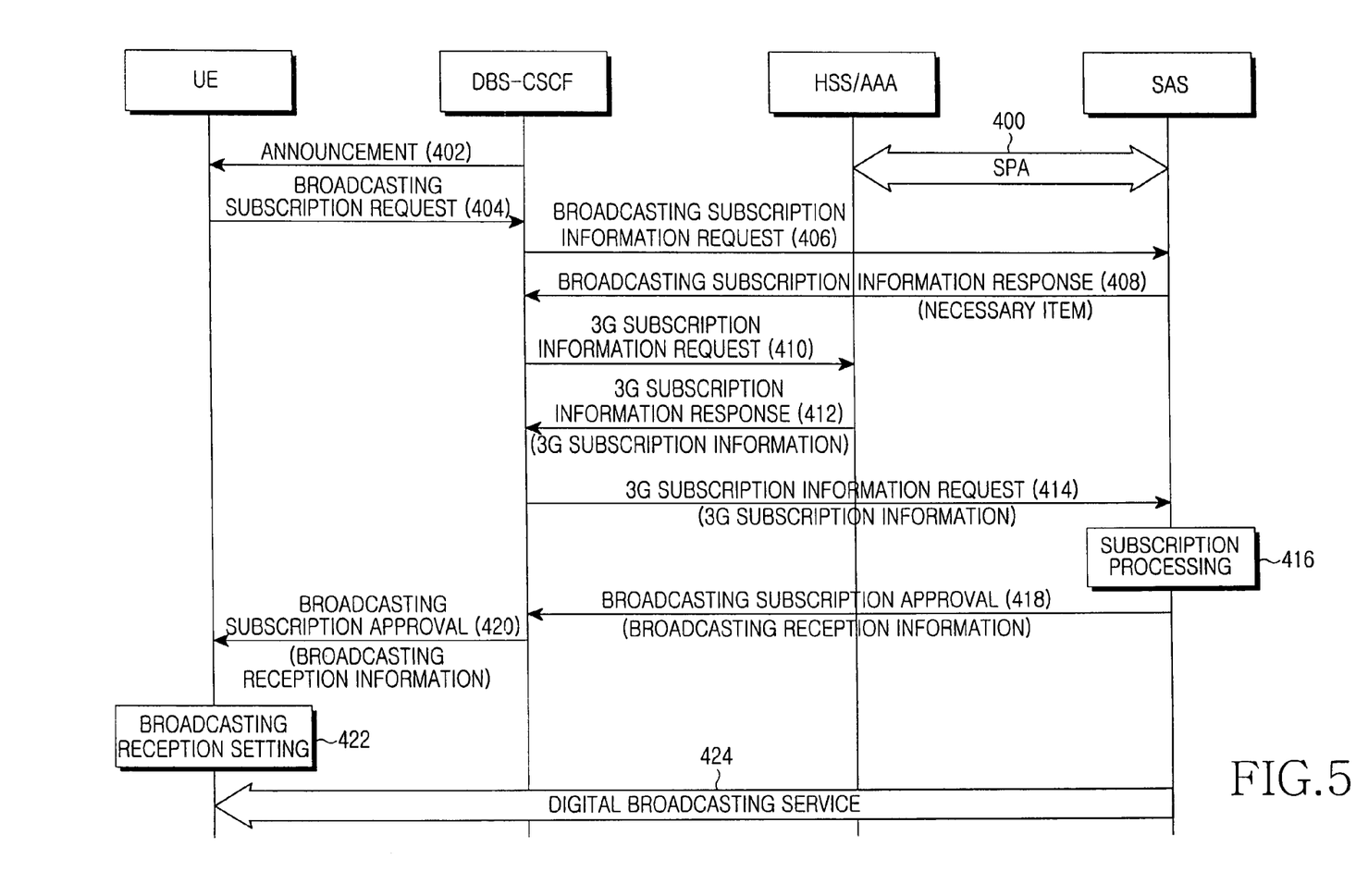
FIG. 5 is a flow diagram illustrating a signal flow for a subscription procedure in the case where 3G network subscriber information is sufficient to subscribe to the digital broadcasting according to a fourth preferred embodiment of the present invention.
Figure 6:
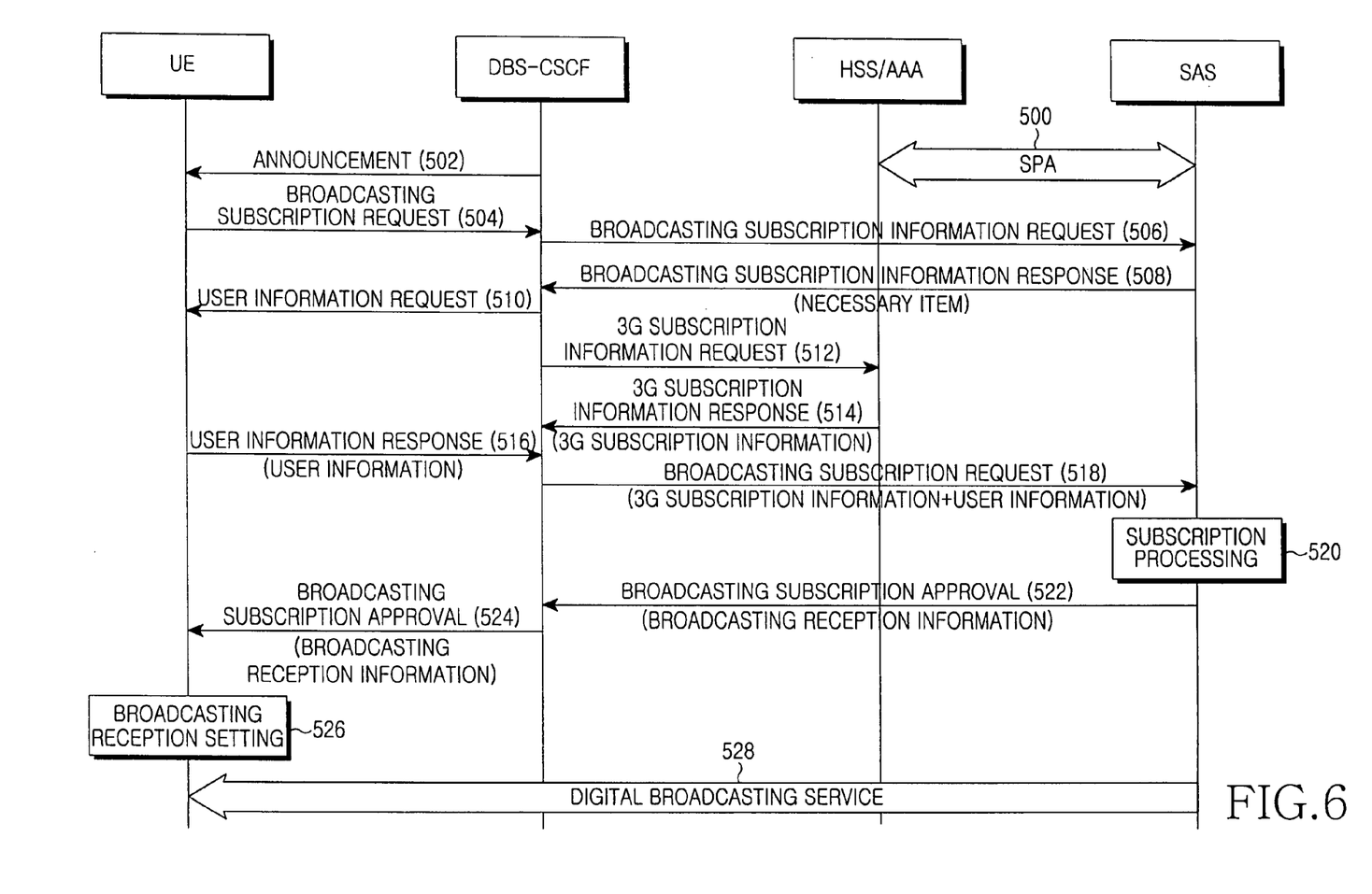
FIG. 6 is a flow diagram illustrating a signal flow for a subscription procedure in the case where user personal information and the 3G network subscriber information, is required to subscribe to the digital broadcasting according to a fifth preferred embodiment of the present invention.
Figure 7:
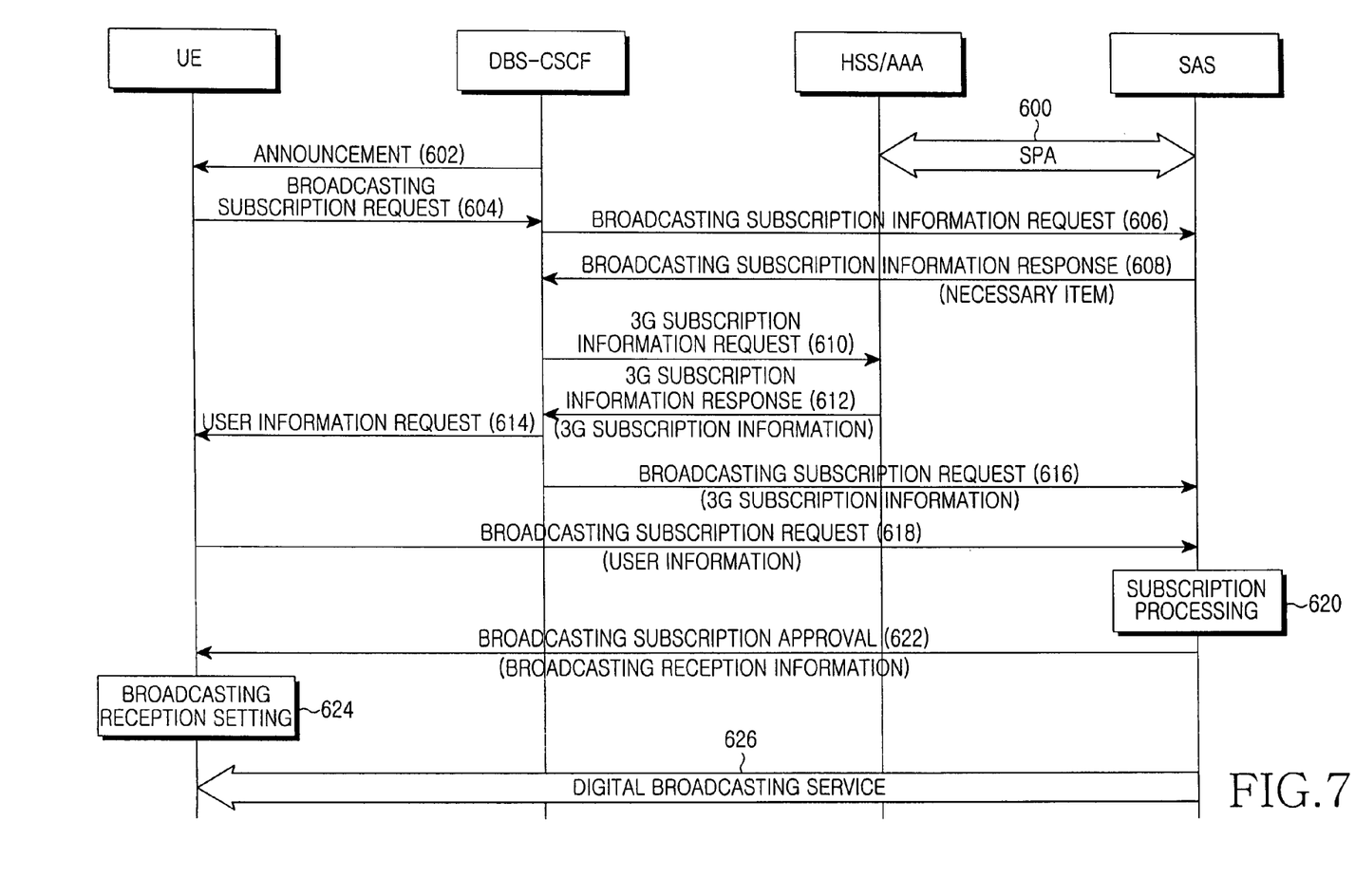
FIG. 7 is a flow diagram illustrating a signal flow for a subscription procedure in the case where the user personal information and the 3G network subscriber information, is required to subscribe to the digital broadcasting according to a sixth preferred embodiment of the present invention.

FIGS. 5, 6 and 7 illustrate procedures for subscribing to a digital broadcasting service in the case where the SPA does not specify items needed for digital broadcasting subscription according to preferred embodiments of the present invention.

FIG. 5 illustrates a subscription procedure when 3G network subscription information suffices for a digital broadcasting subscription under an SPA having no specifics about items required for the digital broadcasting subscription according to a fourth preferred embodiment of the present invention.

Referring to FIG. 5, the SAS defines the SPA with the HSS/AAA in step 400. In step 402, the DBS-CSCF announces that digital broadcasting is available to a user in the current location according to the SPA. The UE of the user, who has not subscribed to digital broadcasting yet, perceives that the user is now located in a digital broadcasting service area by the announcement procedure.

In step 404, the UE requests subscription to the digital broadcasting to the DBS-CSCF. Because the SPA has no specifics about the items for the digital broadcasting subscription, the DBS-CSCF asks the SAS for the items in response to the subscription request from the user in step 406 and the SAS transmits the items to the DBS-CSCF in step 408. In step 410, the DBS-CSCF asks the HSS/AAA for the 3G network subscription information of the user. Specifically, the DBS-CSCF requests subscription information corresponding to the items to the DBS-CSCF. The HSS/AAA transmits the 3G network subscription information to the DBS-CSCF in step 412.

The DBS-CSCF requests the digital broadcasting subscription to the SAS, while transmitting the 3G network subscription information in IP traffic in step 414. To do so, the DBS-CSCF opens a session by SIP signaling between the DBS-CSCF and the SAS, and interaction between the DBS-CSCF and the SAS occurs through the session. In step 416, the SAS processes the digital broadcasting subscription using the 3G network subscription information. At the same time, the SAS provides the subscription process result to the MUX so that a setting necessary for the UE to receive the digital broadcasting is performed within the DBS. The SAS transmits digital broadcasting reception information to the DBS-CSCF in step 418 in order to notify that the digital broadcasting subscription has been approved. The DBS-CSCF forwards the broadcasting reception information to the UE in step 420. In an alternative embodiment, the transmitter can directly notify the UE of the digital broadcasting subscription approval of steps 418 and 420. In step 422, the UE performs a necessary setting according to the broadcasting reception information. After the setting is completed, the user receives the digital broadcasting service in step 424.

FIG. 6 illustrates a subscription procedure when user personal information is required in addition to 3G network subscription information for digital broadcasting subscription under an SPA having no specifics about items required for the digital broadcasting subscription according to a fifth preferred embodiment of the present invention.

Referring to FIG. 6, the SAS defines the SPA with the HSS/AAA in step 500. The SPA has no specifics about the items for digital broadcasting subscription. In step 502, the DBS-CSCF announces that digital broadcasting is available to a user in the current location according to the SPA. The UE of the user, who has not subscribed to digital broadcasting yet, perceives that the user is now located in a digital broadcasting service area by the announcement procedure.

In step 504, the UE requests subscription to the digital broadcasting to the DBS-CSCF. Because the SPA has no specifics about the items for the digital broadcasting subscription, the DBS-CSCF asks the SAS for the items in response to the subscription request from the user in step 506 and the SAS transmits the items to the DBS-CSCF in step 508. In step 512, the DBS-CSCF asks the HSS/AAA for the 3G network subscription information of the user. The HSS/AAA transmits the 3G network subscription information to the DBS-CSCF in step 514. Meanwhile, aside from the 3G network subscription information, the DBS-CSCF requests the user personal information of the user to the UE in step 510 and receives the user's personal information from the UE in step 516.

In step 518, the DBS-CSCF requests the digital broadcasting subscription to the SAS, transmitting the 3G network subscription information and the user personal information in IP traffic. To do so, the DBS-CSCF opens a session by SIP signaling between the DBS-CSCF and the SAS, and interaction between the DBS-CSCF and the SAS occurs through the session. The DBS-CSCF is responsible for management of the session. In step 520, the SAS processes the digital broadcasting subscription using the 3G network subscription information and the user personal information. At the same time, the SAS provides the subscription process result to the MUX so that a setting necessary for the UE to receive the digital broadcasting is performed within the DBS.

In step 522, the SAS transmits digital broadcasting reception information to the DBS-CSCF in order to notify that the digital broadcasting subscription has been approved. The DBS-CSCF forwards the broadcasting reception information to the UE in step 524. In an alternative embodiment, the transmitter can directly notify the UE of the digital broadcasting subscription approval of steps 522 and 524. In step 526, the UE performs a necessary setting according to the broadcasting reception information. After the setting is completed, the user receives the digital broadcasting service in step 528.

FIG. 7 illustrates a subscription procedure when user personal information is needed in addition to 3G network subscription information for digital broadcasting subscription under an SPA having no specifics about items required for the digital broadcasting subscription according to a sixth preferred embodiment of the present invention.

Referring to FIG. 7, the SAS defines the SPA with the HSS/AAA in step 600. The SPA has no specifics about the items for digital broadcasting subscription. In step 602, the DBS-CSCF announces that digital broadcasting is available to a user in the current location according to the SPA. The UE of the user who has not subscribed to digital broadcasting yet perceives that it can receive the digital broadcasting where it is now located.

In step 604, the UE requests subscription to the digital broadcasting to the DBS-CSCF. Because the SPA has no specifics about the items for the digital broadcasting subscription, the DBS-CSCF asks the SAS for the items in response to the subscription request from the user in step 606 and the SAS transmits the items to the DBS-CSCF in step 608.

Meanwhile, in step 610, the DBS-CSCF asks the HSS/AAA for the 3G network subscription information of the user. The HSS/AAA transmits the 3G network subscription information to the DBS-CSCF in step 612. Aside from the 3G network subscription information, the DBS-CSCF requests the user personal information of the user to the UE in step 614.

In step 616, the DBS-CSCF requests the digital broadcasting subscription to the SAS, while transmitting the 3G network subscription information in IP traffic. To do so, the DBS-CSCF opens a session by SIP signaling between the DBS-CSCF and the SAS, and interaction between the DBS-CSCF and the SAS occurs through the session. In step 618, the UE requests the digital broadcasting subscription directly to the SAS, transmitting the user personal information requested in step 614 in IP traffic. To do so, a session is opened between the UE and the SAS, which interact with each other through the session. As described above, the digital broadcasting subscription is requested in step 616 and 618.

In step 620, the SAS processes the digital broadcasting subscription using the 3G network subscription information and the user personal information. At the same time, the SAS provides the subscription process result to the MUX so that a setting necessary for the UE to receive the digital broadcasting is performed within the DBS. In step 622, the SAS transmits digital broadcasting reception information to the UE, notifying of approval of the digital broadcasting subscription. The SAS transmits the digital broadcasting subscription approval in IP traffic to the UE, transparently passing the DBS-CSCF, or a transmitter of the digital broadcasting system transmits it directly to the UE. In step 624, the UE performs a necessary setting according to the broadcasting reception information. After the setting is completed, the user receives the digital broadcasting service in step 626.

Figure 8:
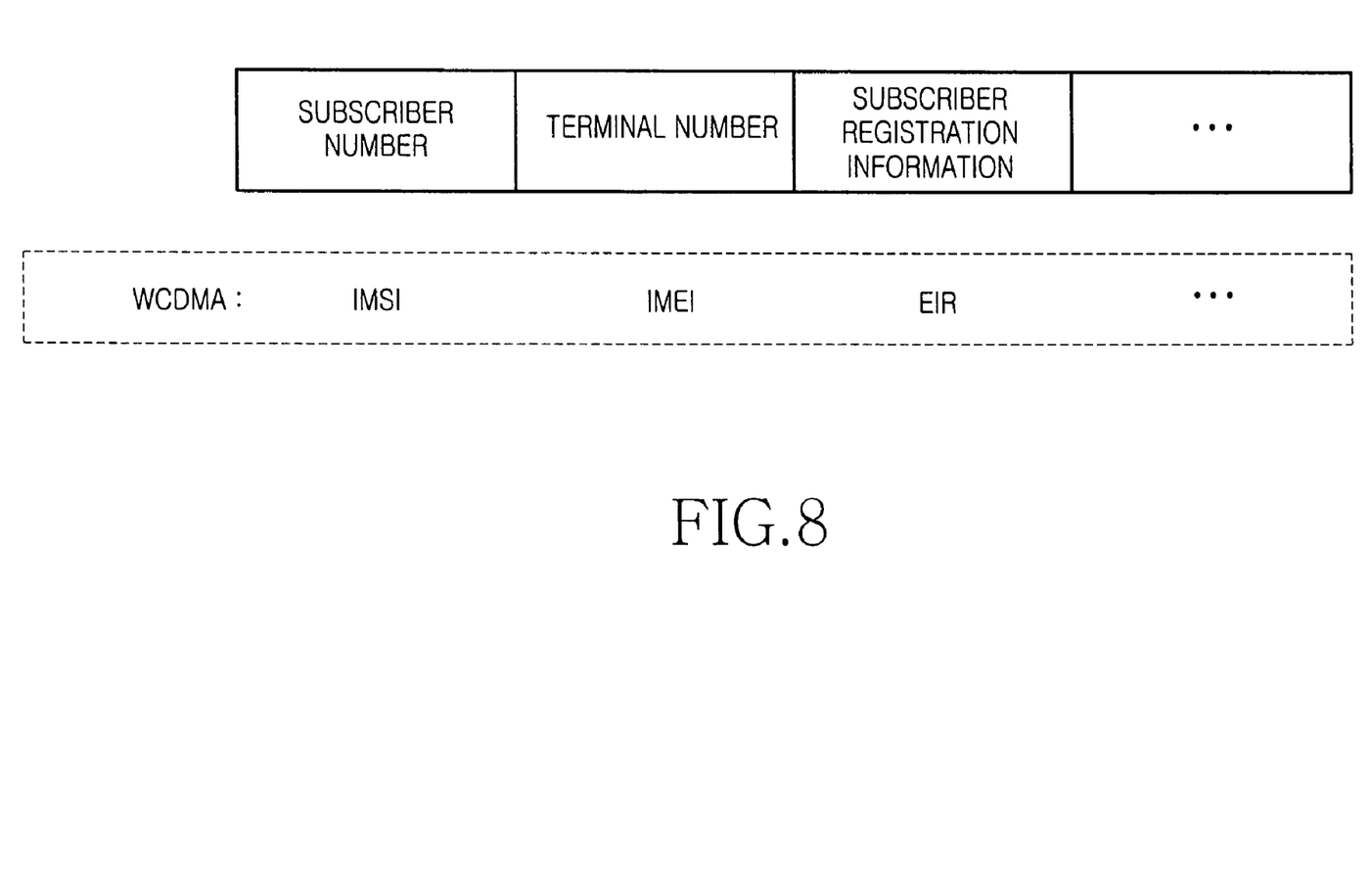
FIG. 8 illustrates the format of the 3G network subscription information that a DBS-CSCF (Digital Broadcasting System-Call Session Control Function) transmits to the SAS according to a preferred embodiment of the present invention.

FIG. 8 illustrates the format of the 3G network subscription information that the DBS-CSCF transmits to the SAS according to a preferred embodiment of the present invention. The 3G network subscription information is made up of a subscriber number, a terminal number, subscriber registration information representing the current subscription status such as normal/theft/arrear, etc. In the WCDMA system, the subscriber number corresponds to an IMSI (International Mobile Subscriber Identity), the terminal number corresponds to an IMEI (International Mobile Equipment Identity), and the subscriber registration information corresponds to an EIR (Equipment Identity Register).

According to a preferred embodiment of the present invention, the digital broadcasting reception information that the SAS transmits to the UE includes information about channels serving the digital broadcasting and key values by which to scramble corresponding information. Also, the user personal information includes information about a broadcasting service type, favorite channels, and a user ID & a password for reception of the digital broadcasting. The broadcasting service type indicates which broadcasting service the user is to receive, for example, whether the user is to receive a basic broadcasting service or selected broadcasting contents. The user personal information may further include a QoS (Quality of Service) field indicating a requested QoS for the broadcasting service.

Figure 9:
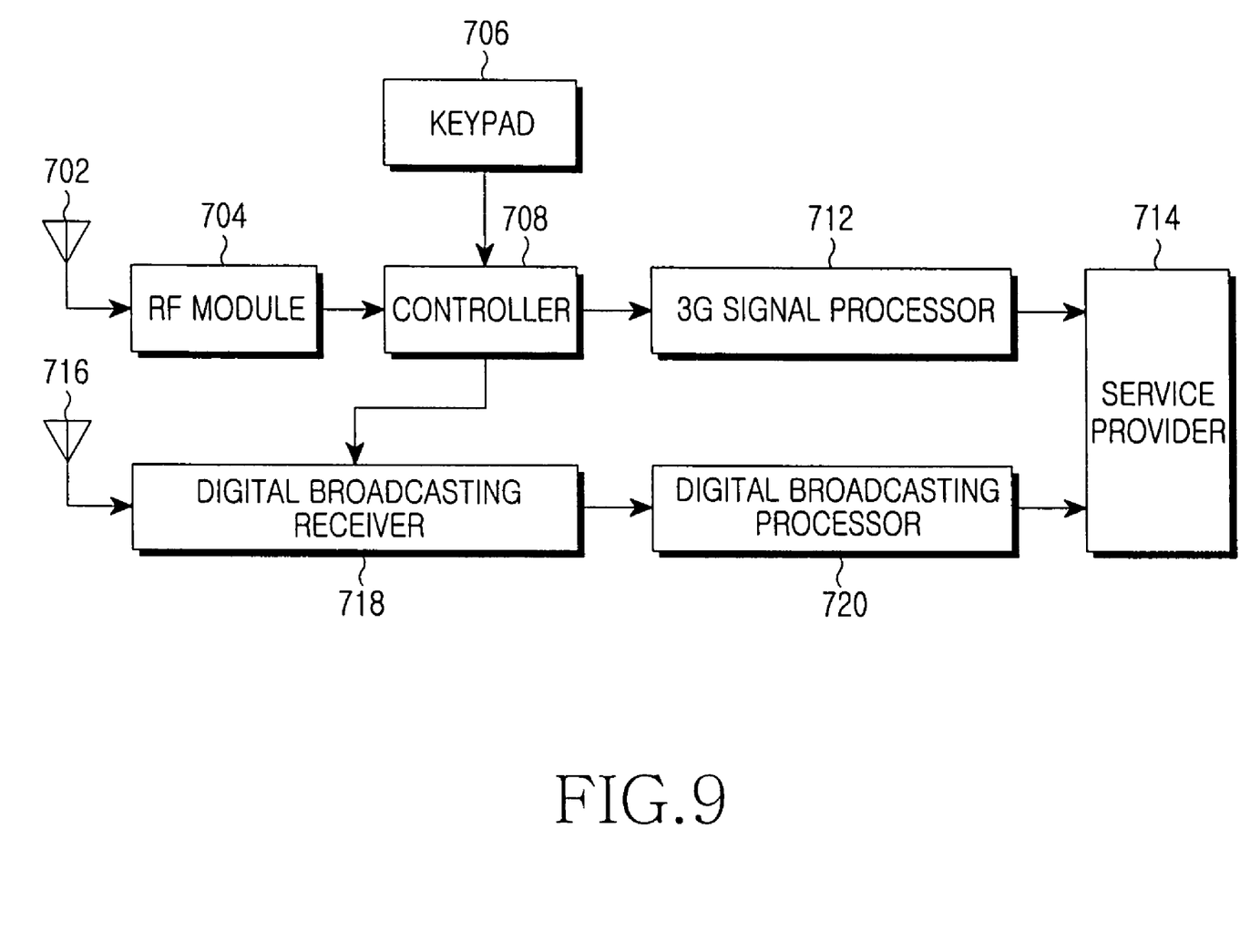
FIG. 9 is a block diagram of a mobile equipment for receiving the digital broadcasting over a 3G network according to a preferred embodiment of the present invention.

FIG. 9 is a block diagram of a UE for receiving digital broadcasting over a 3G network according to a preferred embodiment of the present invention. An RF (Radio Frequency) module 704 converts an RF signal received from an antenna 702 to a predetermined signal under the control of a controller 708. The signal output from the RF module 704 includes a pilot signal, and a paging signal or data for 3G data communication or a power control message from a Node B.

The controller 708 transmits data for a call setup or power control, and transmission data to the RF module 704, for transmission to the Node B. Also, the controller 708 provides overall control to the UE. According to the present invention, the controller 708 interprets digital broadcasting reception information received from the SAS and controls a digital broadcasting receiver 718 to perform a broadcasting reception setting.

The digital broadcasting receiver 718 receives a radio digital broadcasting signal through an antenna 716 according to control of the controller 708. The radio digital broadcasting signal is a digital multimedia signal in which a video signal, an audio signal, and a text signal are multiplexed. Also, the digital broadcasting signal includes a digital multimedia data stream broadcasting signal a VOD (Video On Demand) signal or an MOD (Music On Demand) signal. The digital broadcasting processor 720 analyzes the received signal and processes it so that the user can receive an associated service.

A 3G signal processor 712 processes a 3G network signal received from the controller 708 so that the user can receive a 3G network service. The 3G signal processor 712 also converts a signal including video, audio and text signals received over a 3G network into an appropriate form outputs the signal to a. service provider 714 which displays the signals received from the digital broadcasting processor 720 and the 3G signal processor 712 on a screen (not shown) and/or outputs the received signals through a speaker (not shown).

A keypad 706 is configured in a key matrix structure. It has alphanumerical keys for dialing and function keys for invoking functions. The keypad 706 generates a key signal corresponding to a pressed key to the controller. The user enters user personal information needed for reception of the digital broadcasting service through the keypad 706, for transmission to the SAS. Also, the keypad 706 may be provided with an additional short key for broadcasting service reception, when needed. Moreover, the keypad can further include a touch pad or a virtual keyboard.

As described above, the present invention provides a method of simplifying a subscription procedure for digital broadcasting using 3G network subscription information. Therefore, the user is relieved of providing his user personal information to receive a digital broadcasting service and can easily subscribe to the digital broadcasting service in real time/on line, to thereby receive the digital broadcasting service conveniently. Also, 3G network service providers can yield additional benefits by a 3G network upload function to users, and digital broadcasting service providers take advantage of additional opportunities to provide the digital broadcasting service to the users.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of subscribing to a digital broadcasting service using mobile subscription information associated with subscription to a mobile communication network, comprising the steps of:

generating, by the mobile communication network, upon receiving a request of a user through mobile equipment, a subscription request message containing mobile subscription information of the user that is stored in the mobile communication network and is required for subscription to the digital broadcasting service, and transmitting the generated subscription request message from the mobile communication network to a Digital Broadcasting System (DBS);

receiving from the DBS broadcasting reception information required for the mobile equipment to receive the digital broadcasting service; and setting the broadcasting reception information at the mobile equipment so that the user can receive the digital broadcasting service, notifying the mobile equipment of the digital broadcasting subscription approval and receiving the digital broadcasting service according to the broadcasting reception information at the mobile equipment, wherein the mobile subscription information includes basic subscriber information and information corresponding to an additional service.

2. The method of claim 1, wherein the subscription request message further includes personal information of the user required for subscription to the digital broadcasting service.

3. The method of claim 2, further comprising requesting the personal information of the user in response to the request of the user and receiving the personal information from the user in the mobile communication network.

4. The method of claim 3, further comprising transmitting the personal information of the user from the mobile communication network to the DBS.

5. The method of claim 1, further comprising requesting personal information of the user to the mobile equipment in response to the request of the user, and transmitting the personal information from the mobile equipment to the DBS, transparently passing the mobile communication network.

6. The method of claim 1, wherein receiving the broadcasting reception information includes transmitting the broadcasting reception information from the DBS to the user, transparently passing the mobile communication network.

7. The method of claim 1, further comprising, forming a Service Provider Agreement (SPA) between the mobile communication network and the DBS, the SPA containing broadcasting subscription information required for the subscription to the digital broadcasting service before the request of the user.

8. The method of claim 1, further comprising requesting the mobile subscription information of the user to a Home Subscriber Server (HSS) within the mobile communication network in response to the request of the user, and receiving the mobile subscription information from the HSS.

9. The method of claim 8, wherein the mobile subscription information is determined according to an SPA made before the request of the user.

10. The method of claim 1, wherein the mobile subscription information includes a subscriber number, a terminal number, and subscriber registration information.

11. The method of claim 1, wherein the broadcasting reception information includes information about a channel on which the digital broadcasting service is provided, and a key value by which digital broadcasting information is to be descrambled.

12. The method of claim 2, wherein the personal information of the user includes at least one of information indicating the type of a broadcasting service that the user desires, a Quality of Service (QoS) required for receiving the digital broadcasting service, and an IDentifier (ID) and password of the user.

13. The method of claim 5, wherein the personal information of the user includes at least one of information indicating the type of a broadcasting service that the user desires, a Quality of Service (QoS) required for receiving the digital broadcasting service, and an IDentifier (ID) and password of the user.

14. The method of claim 1, wherein receiving the broadcasting reception information includes receiving the broadcasting reception information through the mobile communication network.

15. A method of subscribing to a digital broadcasting service using mobile subscription information associated with subscription to a mobile communication network, comprising the steps of:
requesting subscription items required for subscription to the digital broadcasting service, upon a request of a user through mobile equipment and receiving the subscription items from a Digital Broadcasting System (DBS);
generating, by the mobile communication network, upon receiving the request of the user through the mobile equipment, a subscription request message containing mobile subscription information of the user that is stored in the mobile communication network and is required for the subscription to the digital broadcasting service and transmitting, to the DBS, the generated subscription request message;
receiving from the DBS broadcasting reception information required for the mobile equipment to receive the digital broadcasting service; and
setting the broadcasting reception information at the mobile equipment so that the user can receive the digital broadcasting service, notifying the mobile equipment of the digital broadcasting subscription approval and receiving the digital broadcasting service according to the broadcasting reception information at the mobile equipment,
wherein the mobile subscription information includes basic subscriber information and information corresponding to an additional service.

16. The method of claim 15, wherein the subscription request message further includes personal information of the user required for subscription to the digital broadcasting service.

17. The method of claim 16, further comprising requesting the personal information of the user in response to the request of the user and receiving the personal information from the user in the mobile communication network.

18. The method of claim 17, further comprising transmitting the personal information of the user from the mobile communication network to the DBS.

19. The method of claim 15, further comprising requesting personal information of the user to the mobile equipment in response to the request of the user, and transmitting the personal information from the mobile equipment to the DBS, transparently passing the mobile communication network.

20. The method of claim 15, wherein receiving the broadcasting reception information includes transmitting the broadcasting reception information from the DBS to the user, transparently passing the mobile communication network.

21. The method of claim 15, further comprising forming a Service Provider Agreement (SPA) between the mobile communication network and the DBS, before the request of the user, wherein broadcasting subscription information required for the subscription to the digital broadcasting service in not included in the SPA.

22. The method of claim 15, further comprising the step of requesting the mobile subscription information of the user to a Home Subscriber Server (HSS) within the mobile communication network in response to the request of the user, and receiving the mobile subscription information from the HSS.

23. The method of claim 15, wherein the mobile subscription information includes a subscriber number, a terminal number, and subscriber registration information.

24. The method of claim 15, wherein the broadcasting reception information includes information about a channel on which the digital broadcasting service is provided, and a key value by which digital broadcasting information is to be descrambled.

25. The method of claim 16, wherein the personal information includes at least one of information indicating the type of a broadcasting service that the user desires, a Quality of Service (QoS) required for the digital broadcasting service, and an IDentifier (ID) and password of the user.

26. The method of claim 19, wherein the personal information includes at least one of information indicating the type of a broadcasting service that the user desires, a Quality of Service (QoS) required for the digital broadcasting service, and an IDentifier (ID) and password of the user.

27. The method of claim 15, wherein receiving the broadcasting reception information includes receiving the broadcasting reception information through the mobile communication network.

28. A system having a mobile communication network and a Digital Broadcasting System (DBS) which interact with each other and have made a Service Provider Agreement (SPA) between each other, the system comprising:
a first subscription management server for generating, upon receiving a request of the user through a mobile equipment that has subscribed to the mobile communication network and is capable of receiving a digital broadcasting service from the DBS, a subscription request message containing mobile subscription information of the user that is stored in the mobile communication network and is required for subscription to the digital broadcasting service, and transmitting the generated subscription request message containing the mobile subscription information to the DBS;
a gateway for discriminating the mobile subscription information received from the first subscription management server and transmitting the mobile subscription information to the DBS; and
a second subscription management server connected to the first subscription management server through the gateway, for processing the subscription of the user to the digital broadcasting service using the mobile subscription information and personal information of the user received from one of the first subscription management server and the user, notifying the mobile equipment of the digital broadcasting subscription approval and transmitting to the mobile equipment broadcasting reception information required for reception of the digital broadcasting service, wherein the mobile subscription information includes basic subscriber information and information corresponding to an additional service.

29. The system of claim 28, wherein if broadcasting subscription information required for subscription to the digital broadcasting service is not included in the SPA, the first subscription management server requests the broadcasting subscription information to the second subscription management server and receives the broadcasting subscription information from the second subscription management server.

30. The system of claim 28, wherein the first subscription management server transmits to the second subscription management server a subscription request message including the personal information of the user required for the subscription to the digital broadcasting service.

31. The system of claim 30, wherein the first subscription management server requests the personal information of the user to the user in response to the request of the user and receives the personal information from the user.

32. The system of claim 31, wherein the first subscription management server transmits the personal information of the user to the second subscription management server.

33. The system of claim 28, wherein the first subscription management server requests the personal information of the user to the mobile equipment in response to the request of the user and the personal information is transmitted from the mobile equipment to the DBS, transparently passing the mobile communication network.

34. The system of claim 28, wherein the broadcasting reception information is transmitted from the DBS to the user, transparently passing the mobile communication network.

35. The system of claim 28, further comprising a Home Subscriber Server (HSS) for transmitting the mobile subscription information of the user to the first subscription management server, upon a request of the first subscription management server.

36. The system of claim 35, wherein the mobile subscription information is determined according to the SPA formed between the mobile communication network and the DBS before the request of the user.

37. The system of claim 28, wherein the mobile subscription information includes a subscriber number, a terminal number, and subscriber registration information.

38. The system of claim 28, wherein the broadcasting reception information includes information about a channel on which the digital broadcasting service is provided, and a key value by which digital broadcasting information is to be descrambled.

39. The system of claim 30, wherein the personal information includes at least one of information indicating the type of a broadcasting service that the user desires, a Quality of Service (QoS) required for the digital broadcasting service, and an IDentifier (ID) and password of the user.

40. The system of claim 28, wherein the second subscription management server transmits the broadcasting reception information to the mobile equipment through the mobile communication network.

* * * * *